United States Patent [19]

Davis et al.

[11] Patent Number: 5,314,056

[45] Date of Patent: May 24, 1994

[54] HIGH-SPEED VIBRATORY ALIGNMENT AND SINGULATION CONVEYOR

[75] Inventors: Walter L. Davis, Milton-Freewater, Oreg.; James E. Anderson, Walla Walla, Wash.

[73] Assignee: Key Technology, Inc., Walla Walla, Wash.

[21] Appl. No.: 35,844

[22] Filed: Mar. 23, 1993

[51] Int. Cl.$^5$ ............................................ B65G 47/24
[52] U.S. Cl. ................................... 198/396; 198/443; 198/453; 198/758
[58] Field of Search ............... 198/443, 453, 454, 396, 198/752, 758

[56] References Cited

U.S. PATENT DOCUMENTS

| 621,237 | 3/1899 | Fisher | 198/604 |
|---|---|---|---|
| 2,287,823 | 6/1942 | Pearson | 198/446 |
| 2,456,031 | 12/1948 | Spain | 198/446 |
| 2,684,781 | 7/1954 | Allen et al. | 198/443 |
| 2,813,617 | 11/1957 | Sheetz | 198/454 |
| 2,835,373 | 5/1958 | Bickley | 209/539 |
| 2,987,166 | 6/1961 | Gray | 198/604 |
| 3,280,961 | 10/1966 | McCombie | 198/604 |
| 3,305,067 | 2/1967 | Mayer | 198/443 X |
| 3,628,648 | 12/1971 | McClusky | 198/443 |
| 3,768,627 | 10/1973 | Anderson | 198/396 X |
| 4,094,123 | 6/1978 | Carlson | 198/752 |
| 4,201,313 | 5/1980 | Kirsch | 198/396 X |
| 4,421,222 | 12/1983 | Stuermer | 198/396 X |
| 5,044,240 | 9/1991 | Fischer et al. | 83/161 |

FOREIGN PATENT DOCUMENTS

| 0111310 | 8/1980 | Japan | 198/443 |
|---|---|---|---|
| 0467853 | 5/1975 | U.S.S.R. | 198/453 |
| 0922208 | 3/1963 | United Kingdom | 198/443 |

*Primary Examiner*—James R. Bidwell
*Attorney, Agent, or Firm*—Wells, St. John, Roberts, Gregory & Matkin

[57] ABSTRACT

A vibratory feed device is described for producing a high-speed single-file stream of aligned food articles. The feed device comprises a vibratory guide trough extending longitudinally from a receiving end to a discharge end. The guide trough has inclined and transversely-opposed sidewalls. An endless feed belt travels longitudinally through the guide trough from the receiving end to the discharge end. The feed belt has outer portions which incline upwardly to form a concave conveyor surface for conveying food articles through the guide trough. The guide trough oscillates to singulate and align food articles within the concave conveyor surface. The feed device also includes a redirection sheave at the discharge end of the guide trough. The redirection sheave supports the feed belt along a redirection arc which extends at least partially about the redirection sheave. An endless hold-down belt faces the feed belt along the redirection arc to hold food articles against the feed belt.

43 Claims, 7 Drawing Sheets

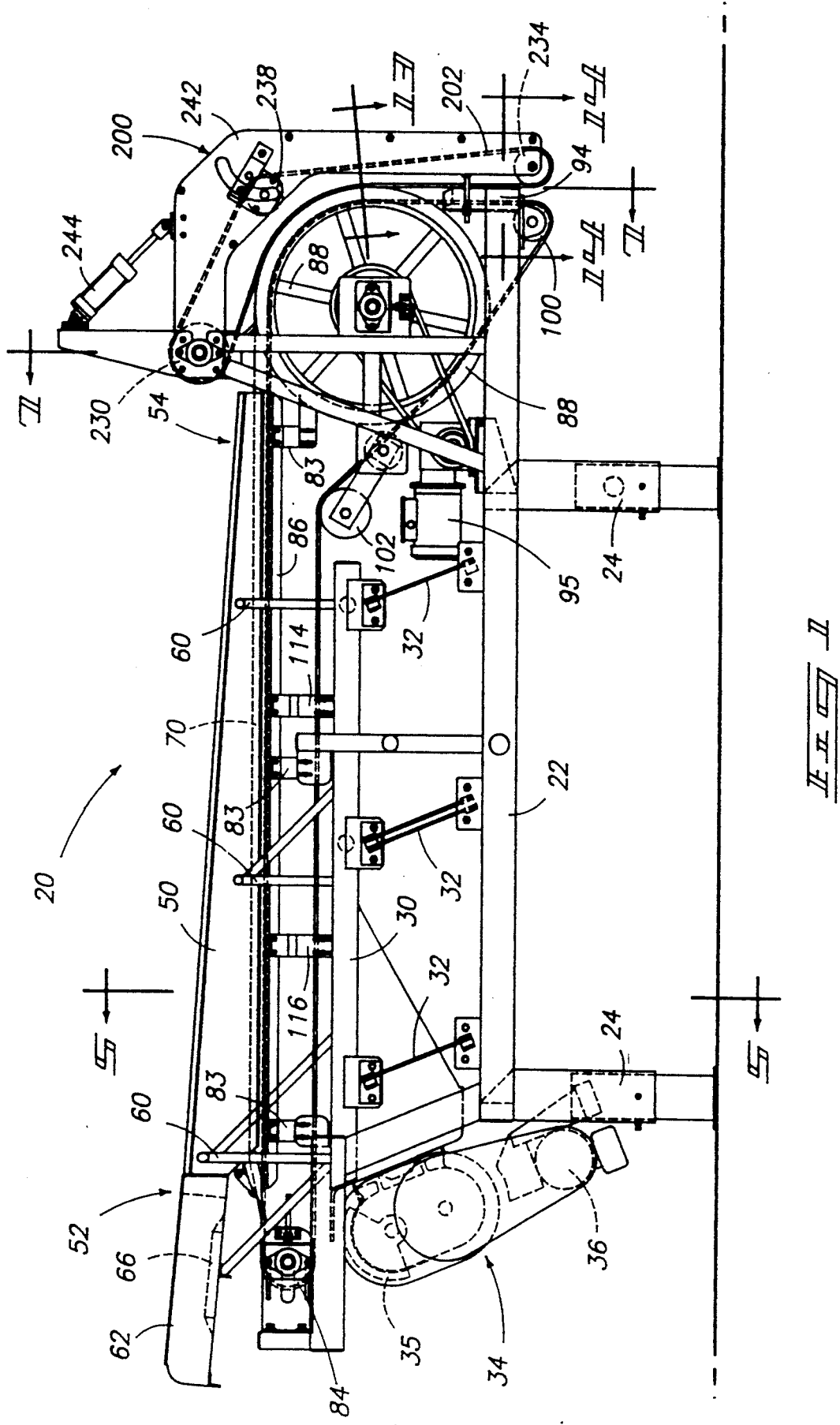

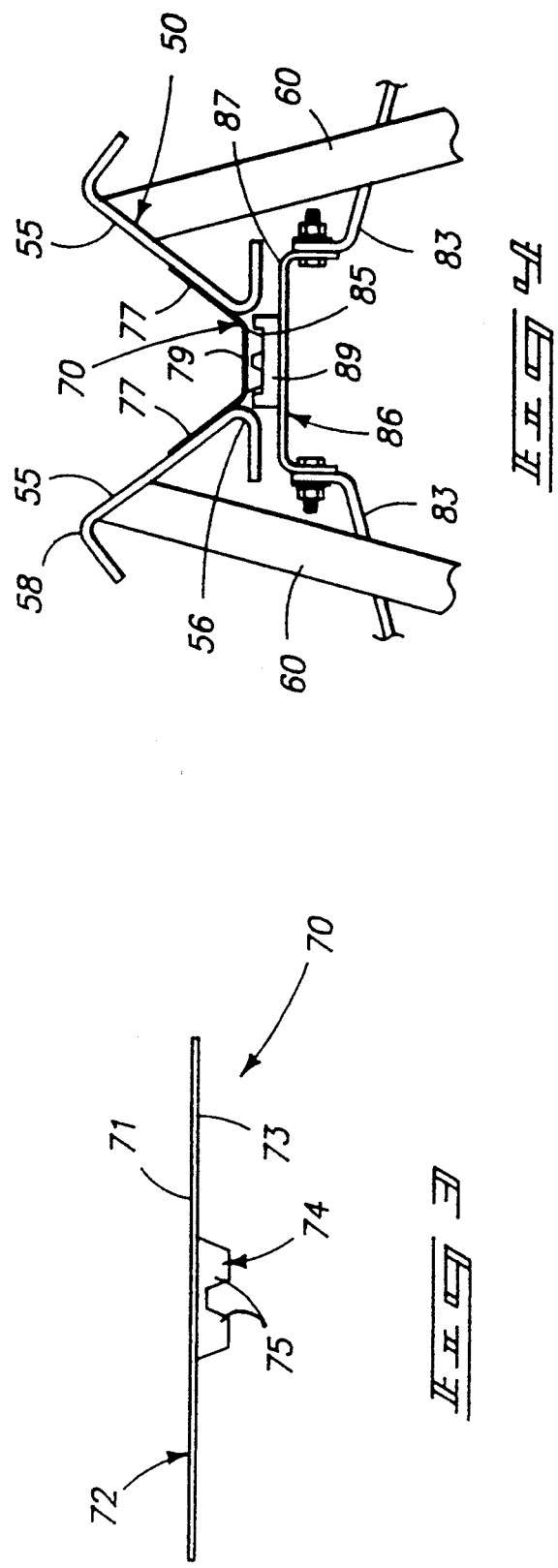
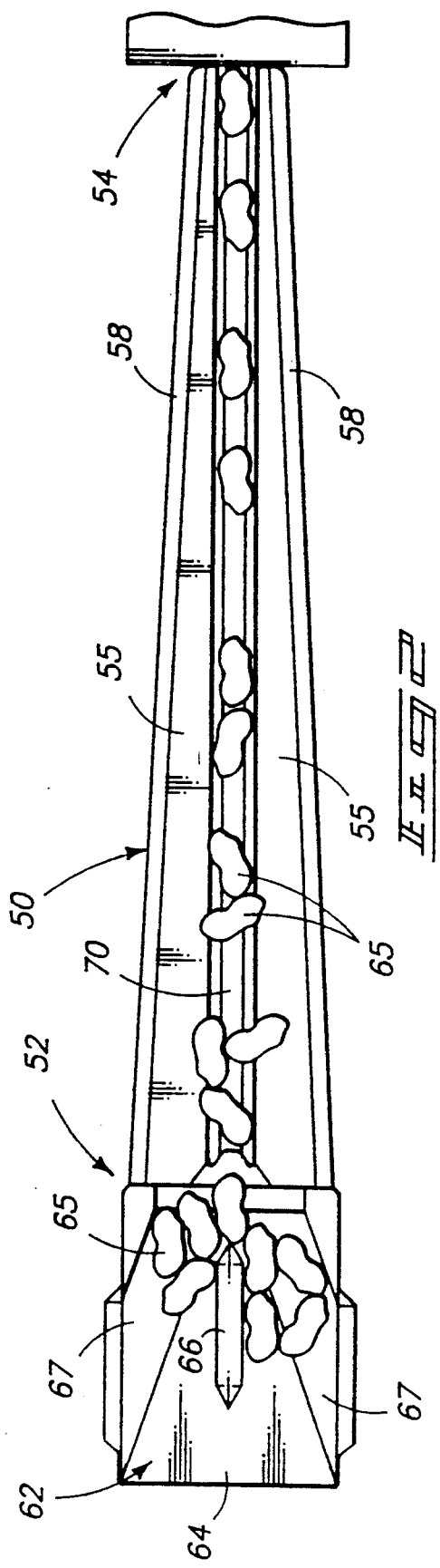

HIGH-SPEED VIBRATORY ALIGNMENT AND SINGULATION CONVEYOR

TECHNICAL FIELD

This invention relates to high-speed food article singnulation and orientation.

BACKGROUND OF THE INVENTION

There are many situations in the field of bulk materials handling and food processing where it is necessary to produce an ordered stream of objects from a bulk supply of such objects supplied haphazardly in non-uniform orientations. Many such applications require objects to be aligned in a single file for inspection or for supply to automated processing machinery. In some situations, it is further required to align oblong objects, such as potatoes, so that their major longitudinal axes correspond to their direction of travel. Automatic sizing and grading equipment, for example, often requires such singulation and prescribed orientation of food articles.

Cutting operations present particular difficulties with respect to vegetable feeding and singulation. Vegetable cutting devices often accept vegetables only in a single file, although they are capable of receiving such vegetables at a very high feed rate. Efficient operation of such cutting devices requires singulation, orientation, and acceleration of food articles from a bulk stream of such articles—at a feed rate which is difficult to attain with prior art devices.

Feeding potatoes to a helical potato cutter is a specific example of a situation requiring a high-speed, singulated, and oriented stream of articles. One type of helical potato cutter is disclosed in a U.S. patent application by Marc A. Frey et al., filed on Mar. 23, 1993, entitled "Vegetable Cutting System." This type of potato cutter has a vertical entrance aperture into which potatoes must be flung or projected in a downward direction. The potatoes must be oriented as they enter the cutter so that their major longitudinal axes correspond to their direction of travel. This orientation is required not only because of the restricted size of the cutter entrance aperture, but also to ensure that potato strips or coils produced by the cutter will each be of maximum length.

Previous devices for feeding food articles in a single file to cutters and other devices have included belt conveyors, vibratory conveyors, and hydraulic delivery systems. These devices have been used with varying degrees of success.

The invention described below provides singulated and properly oriented food articles at a consistently high feed rate for supply to a device such as disclosed by Frey et al. Furthermore, the invention can be configured to discharge food articles at various angles from horizontal, such as might be required by a variety of downstream processing equipment. The preferred embodiment of the invention is simple, reliable, and easy to clean and maintain, providing significant advantages over prior article feed devices.

BRIEF DESCRIPTION OF THE DRAWINGS

The accompanying drawings show a potato feed system in accordance with a preferred embodiment of the invention.

FIG. 1 is a side view of a high-speed singulation and feed device in accordance with a preferred embodiment of the invention.

FIG. 2 is a top view showing a guide trough in accordance with the preferred embodiment of FIG. 1.

FIG. 3 is a cross-sectional view of a feed belt in accordance with the preferred embodiment of FIG. 1.

FIG. 4 is a simplified sectional view showing a feed belt within a guide trough in accordance with the preferred embodiment of FIG. 1.

FIG. 8 is a partial receiving end view of the preferred embodiment of FIG. 1.

DETAILED DESCRIPTION OF THE PREFERRED EMBODIMENT

Figure 5:
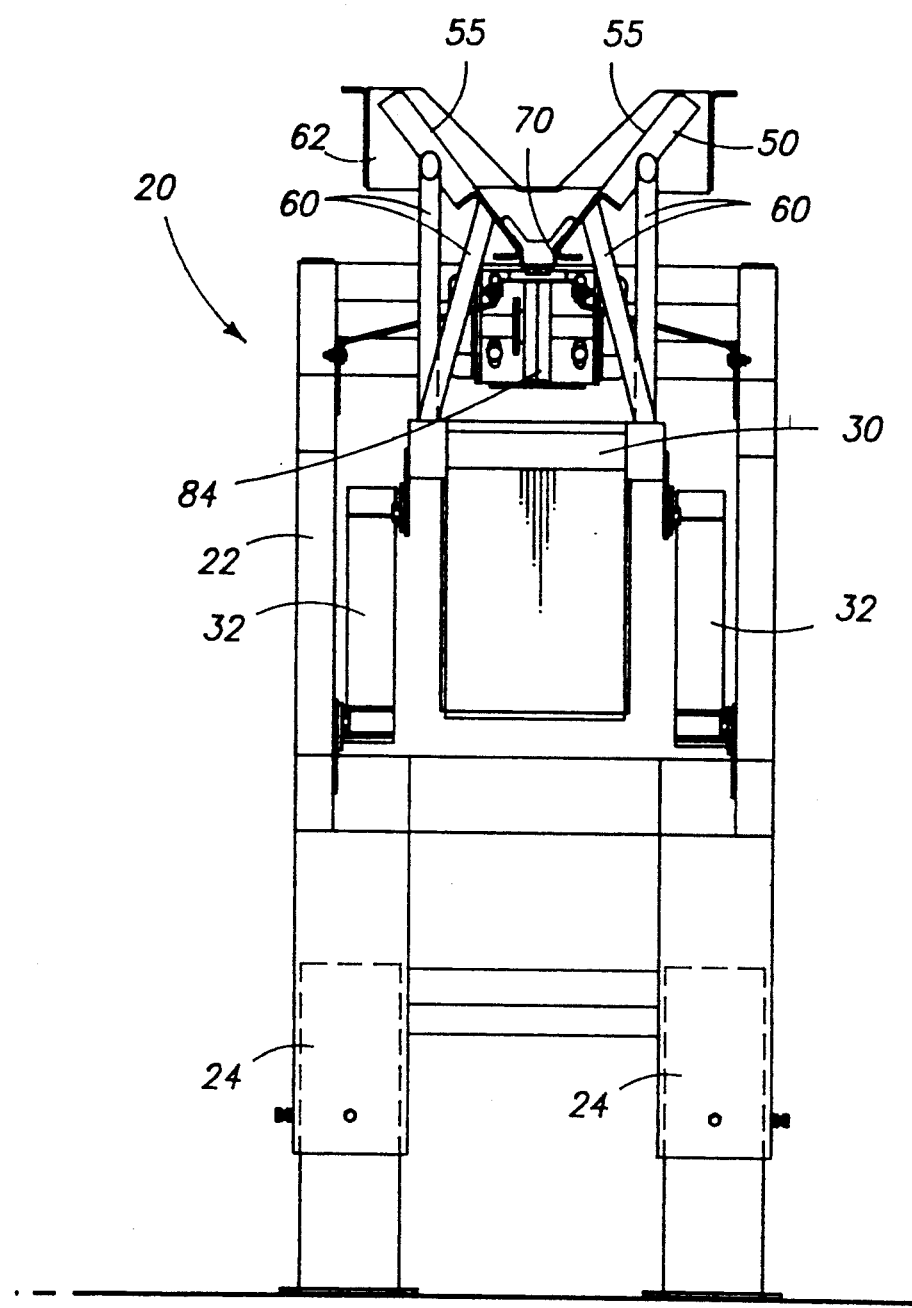
FIG. 5 is a sectional view taken along line 5—5 of FIG. 1.

This disclosure of the invention is submitted in furtherance of the constitutional purposes of the U.S. Patent Laws "to promote the progress of science and useful arts." U.S. Constitution, Article 1, Section 8.

FIG. 1 shows vibratory feed conveyor or device in accordance with a preferred embodiment of the invention, generally designated by the reference numeral 20. Feed device 20 produces a high-speed single-file stream of food articles such as potatoes or other oblong vegetables.

The preferred embodiment of the invention is specifically constructed for use in conjunction with a helical potato cutting apparatus such as described by Frey et al. in their U.S. patent application noted above. However, other forms and variations of the invention, all within the scope of this disclosure, will find advantageous operation in conjunction with a variety of other article handling and processing apparatuses.

In operation, feed device 20 accepts a continuous and metered supply of bulk, randomly oriented potatoes or other food articles, and accelerates them horizontally to a desired speed—about 270 feet per minute in the preferred embodiment—while also aligning the potatoes in a single file. Furthermore, the feed device automatically orients the potatoes so that their longitudinal axes are aligned with their direction of travel. After this alignment, orientation, and acceleration, feed device 20 redirects the potatoes downward and ejects or projects them through the air into a receiving aperture of a potato cutter or other food processing machine.

Because of the particular construction of the feed device, the potatoes are stably oriented during flight between the feed device and the potato cutter, with their longitudinal axes remaining aligned with their direction of travel. This alignment is preferable for efficient operation with many types of cutters.

Feed device 20 comprises a stationary frame 22 having vertically adjustable legs and mounting feet 24. The legs are appropriately positioned for mating with downstream processing equipment such as a potato cutter. The preferred embodiment of the invention is configured to work with a potato cutter which receives singly aligned potatoes from above. Thus, feed device 20 is adapted to be mounted on top of a potato cutting apparatus, to throw aligned potatoes downward into a receiving throat of such a cutting apparatus. Legs 24 are adjustable to allow proper setting of the vertical distance between feed device 20 and the potato cutter.

A vibratory bed 30 is supported above stationary frame 22 by a plurality of leaf springs 32. Each leaf spring 32 extends about 14 inches upward from stationary frame 22 at an approximately 22.5 degree angle from vertical to allow vibratory bed 30 to oscillate at a corresponding angle from horizontal. A vibratory drive 34 is connected to vibratory bed 30 to oscillate vibratory bed 30 in a linear motion relative to stationary frame 22. Vibratory drive 34 preferably comprises a eccentrically-mounted counterweight 35 which is driven at a constant speed by a vibratory drive motor 36. The counterweight is rotatably mounted to vibratory bed 30, while vibratory drive motor 36 is mounted to stationary frame 22. A flexible drive belt or chain (not shown) extends between drive motor 36 and counterweight 35 to drive counterweight 35 at a selected speed.

Leaf springs 32 and vibratory drive 34 are selected and mounted to produce an approximately ⅜ inch vibratory stroke at approximately 750 cycles per minute, oriented as noted above at an approximately 22.5 degree angle from horizontal. While these parameters have been found to be optimal in particular applications, other parameters might be more desirable in other applications. It is preferable to provide for a variable stroke and vibration angle so the oscillation parameters can be optimized for various food articles and downstream requirements.

Feed device 20 includes a guide trough 50 which is most easily observed in FIG. 2. Guide trough 50 extends longitudinally from a receiving or infeed end 52 to a discharge or outfeed end 54. It comprises a pair of inclined and transversely-opposed sidewalls 55 which extend longitudinally between receiving end 52 and discharge end 54. Each of sidewalls 55 is oriented at an approximately 37.5 degree angle from vertical, from a lower edge 56 (FIG. 4) to an upper edge 58. The sidewalls converge towards each other toward their lower edges 56.

Lower edges 56 are evenly spaced from each other along the entire lengths of the sidewalls to form a conveyor slot therebetween. Thus, guide trough 50 is downwardly open along its length. The height of the sidewalls tapers from the receiving end to the discharge end of guide trough 50. The guide trough is rigidly attached to vibratory bed 30 by upright mounting members 60 (FIG. 1), for vibratory oscillation with vibratory bed 30.

Receiving end 52 of guide trough 50 is adapted to receive bulk food articles such as potatoes or other vegetables. An optional receiving tray 62 extends longitudinally from guide trough 50. Receiving tray 62 forms a broad receiving surface 64 which extends transversely between opposed sidewalls 55 at receiving end 52. A continuous stream of randomly aligned potatoes 65 is supplied to feed device 20 by dumping them atop receiving tray 62. A raised alignment ridge 66 extends longitudinally along the center of receiving tray 62 to provide preliminary distribution of oblong objects. Receiving surface 64 is positioned at an elevation above lower edges 56 of sidewalls 55. In the absence of optional receiving tray 62, potatoes are dumped directly into guide trough 50.

Feed device 20 includes an endless flexible feed belt 70 which travels longitudinally through guide trough 50 along its open bottom. The construction of feed belt 70 is best observed in the cross-sectional view of FIG. 3. Feed belt 70 is formed by a broad flexible support belt 72 having an outer article contact surface 71 and an inner drive surface 73, and at least one flexible drive and alignment belt 74. More specifically, support belt 72 is an thin (approximately 1/16 inches) endless sheet or strip of nitrile-based material, having a width which is sufficient to not only span the open bottom of guide trough 50, but also to extend upward along sidewalls 55. Such a nitrile material is available from Goodyear Rubber and Supply of Portland, Oreg., designated as "Style #362."

Flexible drive and alignment belt 74 is an endless polyurethane "A"-section drive belt having longitudinal reinforcement for withstanding longitudinal tension. Flexible drive and alignment belt 74 could also be formed by side-by-side "V" belts. In either case, drive and alignment belt 74 forms a pair of centrally aligned projecting ribs 75 which extend from the inner surface of flexible support belt 72. Drive and alignment belt 74 is affixed to inner drive surface 73 of support belt 72 for driving engagement with one or more belt drive pulleys or idler pulleys, as are more fully described below. In practice, belts 72 and 74 are vulcanized together to form a single feed belt with inwardly extending ribs 75. Support belt 72 provides an article support surface which is flexible enough to extend upward into guide trough 50 from beneath. Flexible drive and alignment belt 74 is positioned centrally along the support belt 72 to provide transverse and longitudinal strength so that feed belt 70 can be appropriately tensioned, positioned, and driven.

FIG. 4 shows the position of feed belt 70 within guide trough 50. Feed belt 70 has outer portions or side wings 77 and a central or medial portion 79 which extends between outer portions 77. A stationary belt guide and support rail 86 (also shown in FIG. 1) extends longitudinally beneath feed belt 70 along the length of guide trough 50 from its receiving end 52 to its discharge end 54. Support rail 86 provides vertical support and transverse guidance for feed belt 70. It has at least one groove 85 formed along its length to receive central ribs 75 of feed belt 70 and to maintain feed belt 70 in transverse alignment along its length.

Support rail 86 is formed by a lower metal plate 87 and an upper slide 89. Upper slide 89 is preferably formed of ultra-high molecular weight polyurethane (UHMW) and is suitably affixed to the upper surface of metal plate 87. Pairs of bracket pieces 83 extend between metal plate 87 and stationary frame 22 at both ends of support rail 86 and at an intermediate location along the length of support rail 86. Bracket pieces 83 include slots to allow vertical adjustment of support rail 86. Support rail 86 is thus mounted rigidly to stationary frame 22, so that vibration of guide trough 50 occurs relative to support rail 86.

As shown in FIGS. 4 and 5, outer portions 77 of feed belt 70 extend upward through the open bottom of guide trough 50, and are slidably supported along the length of sidewalls 55 to form a U-shaped or concave article conveyor surface for conveying articles through the guide trough.

Figure 6:
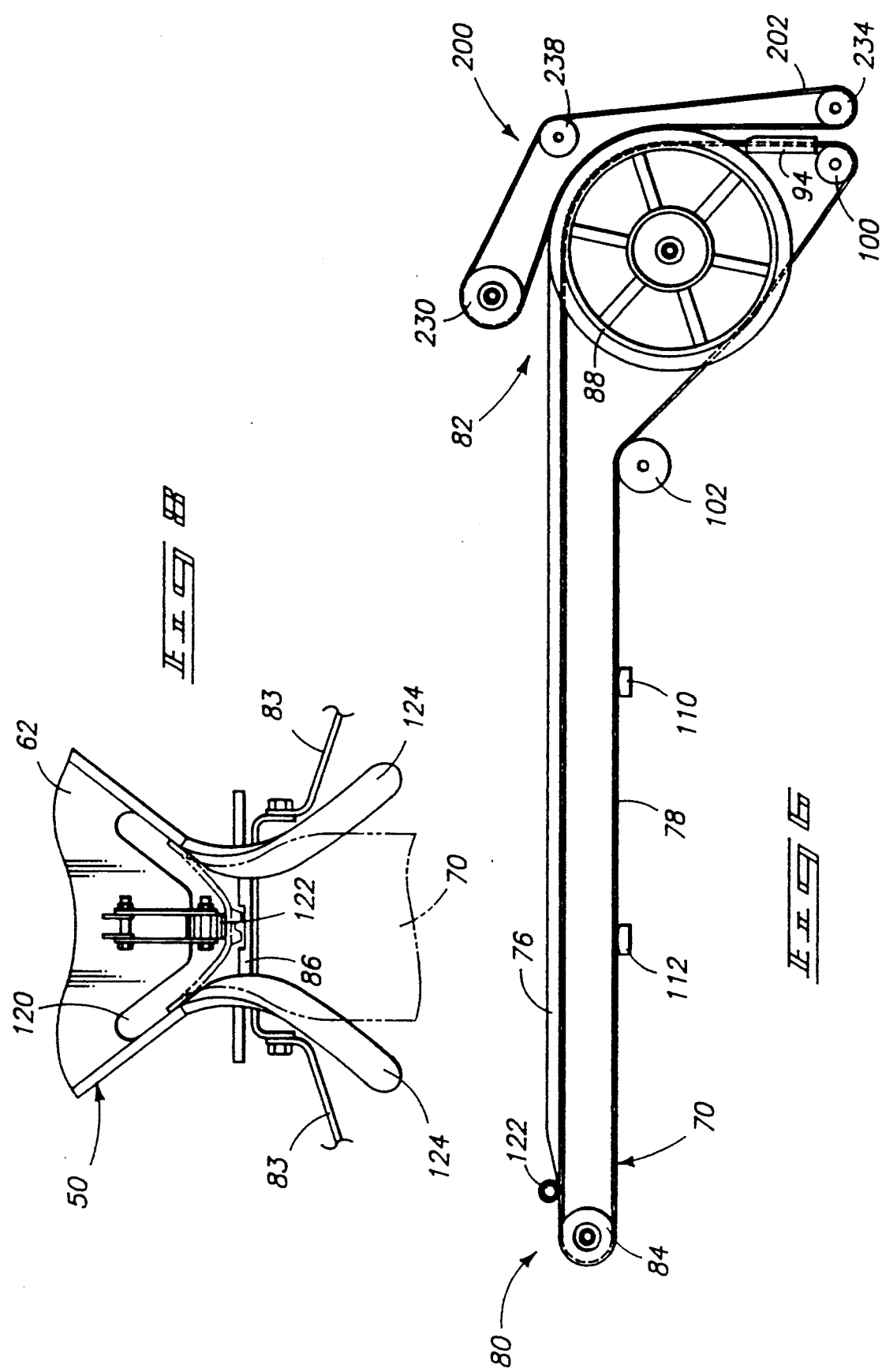
FIG. 6 is a simplified diagrammatic side view of the preferred embodiment of FIG. 1.

FIG. 6 is a side view of feed device 20, showing only feed belt 70 and its associated drive and support components. Feed belt 70 includes an upper flight 76 and a lower flight 78. Upper flight 76 extends from a conveyor infeed end 80 to a conveyor outfeed end 82. Feed belt 70 is supported by an infeed end idler pulley or sheave 84 at its infeed end 80. The longitudinal position of idler pulley 84 is continuously adjustable to increase or decrease the longitudinal tension of feed belt 70. As shown in FIG. 5, idler pulley 84 has parallel V-grooves positioned to receive central ribs 75 of feed belt 70. The parallel V-grooves keep feed belt 70 in proper transverse alignment over idler pulley 84.

Feed belt 70 is supported at its outfeed end by a large-diameter belt drive pulley or redirection sheave 88 positioned for rotation at the discharge end 54 of guide trough 50. Redirection sheave 88 is best observed with reference to FIG. 7. It comprises a spoked wheel having a pair of outer peripheral contact surfaces 90 spaced from each other by a feed belt groove 91. Peripheral contact surfaces 90 face generally radially outward from redirection sheave 88, being slightly inclined radially inward toward the transverse edges of redirection sheave 88. Groove 91 has an inward base around which a pair of adjacent V-grooves 92 extend. V-grooves 92 are complementary to ribs 75 of feed belt 70 to grip and receive ribs 75 therein. Belt groove 91 has inclined sidewalls 93 which extend radially outward from V-grooves 92. Sidewalls 93 face each other, being inclined at an approximately 30 degree angle from vertical to diverge away from each other toward contact surfaces 90. The sidewalls form a concave or U-shaped belt support surface about redirection sheave 88 to support feed belt 70 in a concave or U-shape as it wraps around redirection sheave 88.

Redirection sheave 88 is driven at a constant rotational speed by a motor/gearbox combination 95 (FIG. 1). Motor/gearbox 95 is connected to redirection sheave 88 by a chain or belt. It preferably integrates a slip-clutch to allow drive slippage should the system become clogged or jammed. In addition, an electronic rotational sensor (not shown) is used in conjunction with redirection sheave 88 to detect feed belt jams. The rotational sensor is connected to sound an alarm or to disconnect electrical power when redirection sheave 88 stops rotating. Motor/gearbox 95 is selected to drive feed belt 70 at a constant conveyor speed of approximately 270 feet per minute in the preferred embodiment.

Referring again to FIG. 6, feed belt 70 wraps at least partially around redirection sheave 88. More specifically, redirection sheave 88 supports and drives feed belt 70 along a redirection arc, wherein the redirection arc is formed about a portion of redirection sheave 88. The inclined sidewalls 93 of redirection sheave 88 support outer portions 77 of feed belt 70 in a concave shape for receiving food articles therein, and for conveying such food articles around the redirection arc.

In the preferred embodiment described herein, the redirection arc extends 90 degrees, from horizontal to vertically downward. A feed belt discharge or take-off shoe 94 supports or diverts feed belt 70 along an exit tangent from the redirection arc, wherein the exit tangent extends along a vertical line tangent to redirection sheave 88. Take-off shoe 94 comprises a guide block having a transverse U-shaped or concave groove 96 which is similar in cross-section to groove 91 formed by redirection sheave 88.

Take-off shoe 94 establishes a straight section of feed belt 70 which extends vertically downward from redirection sheave 88 as feed belt 70 leaves contact with redirection sheave 88, while also supporting outer portions 77 of feed belt 70 in a concave shape for holding food articles therein. A lower feed belt idler pulley or sheave 100 supports feed belt 70 below take-off shoe 94. Lower idler pulley 100 is similar to infeed end idler pulley 84, having V-grooves for receiving feed belt ribs 75.

From lower idler pulley 100, feed belt 70 returns upward and rearward to a tensioning roller or pulley 102. Feed belt 70 contacts redirection sheave 88 along its path from lower idler pulley 100 to tensioning pulley 102. Tensioning pulley 102 is spring-loaded in an upward or inward direction to automatically maintain an even longitudinal tension on feed belt 70. Feed belt 70 returns to infeed end idler pulley 84 from tensioning pulley 102.

Lower flight 78 of feed belt 70 is slidably supported at two locations by lower belt supports 110 and 112. Lower belt supports 110 and 112 are mounted from support rail 86 by vertically-adjustable mounting brackets 114 and 116 (FIG. 1). Mounting brackets 114 and 116 allow vertical adjustment of lower belt supports 110 and 112 as required for proper alignment of lower flight 78 relative to upper flight 76.

Referring to FIG. 8, feed belt 70 enters guide trough 50 at its receiving end 52 through a U-shaped aperture 120 formed in receiving tray 62. Feed device 20 includes an infeed belt guide at receiving end 52 of guide trough 50 to guide feed belt 70 into the proper concave shape prior to its entrance into guide trough 50. The belt guide comprises a central guide roller 122 and two opposed belt forming arms 124 which extend rearward from U-shaped aperture 120. These components are mounted to and oscillate with guide trough 50. Central guide roller 122 rests over the medial portion of feed belt 70 to prevent feed belt 70 from contacting the edges of the U-shaped aperture 120. Opposed belt forming arms 124 extend rearwardly to receive and guide feed belt 70 into guide trough 50 through U-shaped aperture 120.

Figure 9:
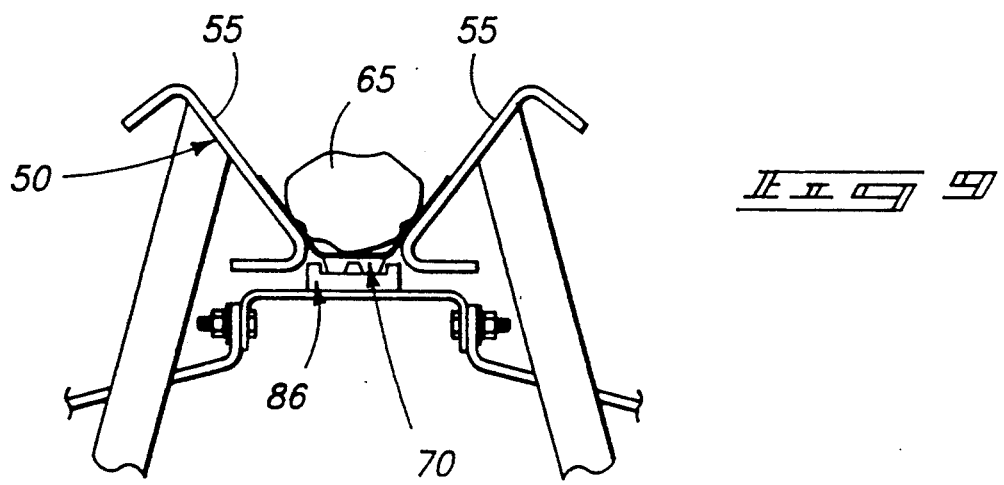
FIG. 9 is a simplified sectional view showing proper vertical adjustment of a feed belt in accordance with the invention.
Figure 10:
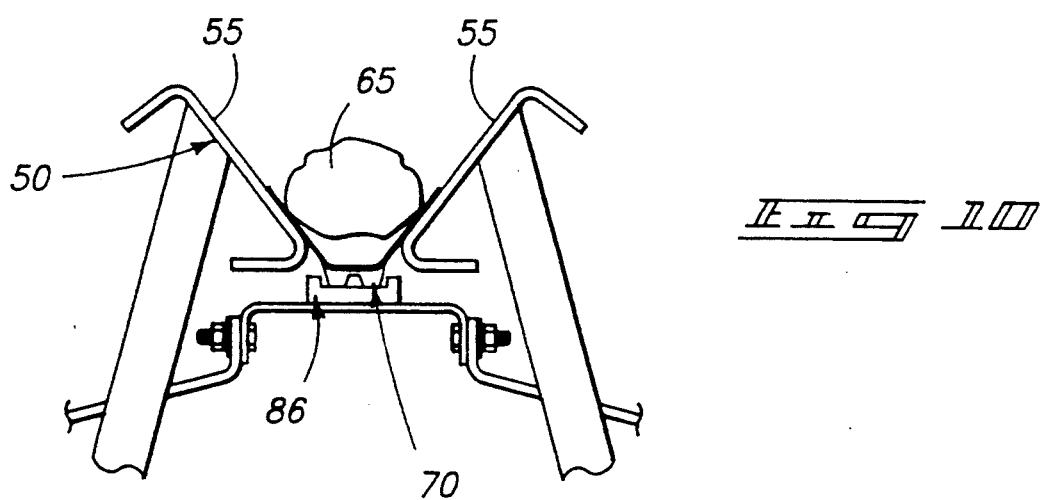
FIG. 10 is a simplified sectional view showing one improper vertical adjustment of a feed belt in accordance with the invention.
Figure 11:
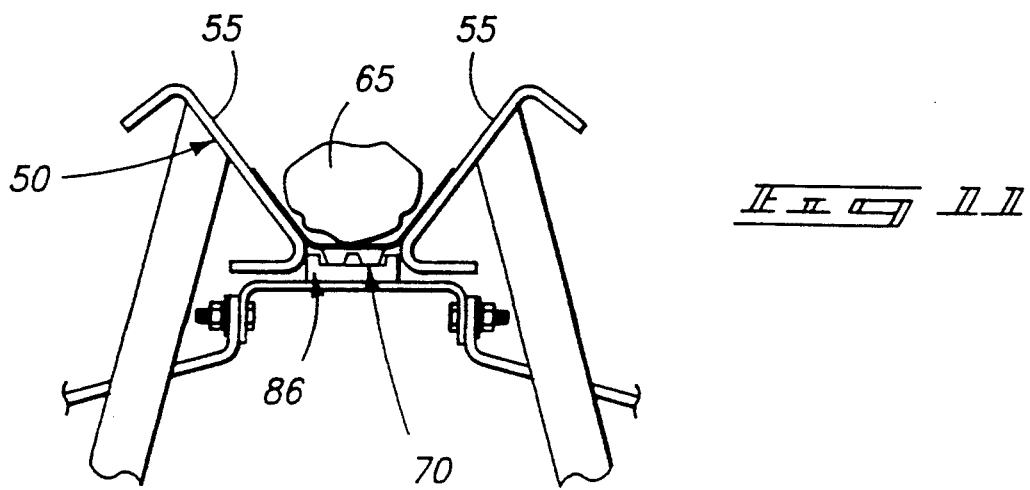
FIG. 11 is a simplified sectional view showing another improper vertical adjustment of a feed belt in accordance with the invention.

FIGS. 9-11 illustrate proper and improper vertical adjustment of feed belt 70 within guide trough 50. As discussed above, support rail 86 supports upper flight 76 of feed belt 70 from beneath. Support rail 86 is vertically adjustable relative to guide trough 50 to adjust and set the vertical elevation of feed belt 70 relative to guide trough 50. Infeed end idler pulley 84 and redirection sheave 88 are also provided with vertical adjustment features so that they can be adjusted to match the position of support rail 86. The vertical relationship between feed belt 70 and guide trough 50 determines the transverse width of medial portion 79 of feed belt 70. Medial portion 79 forms an article conveyor base surface within the U-shaped conveyor surface.

The proper vertical adjustment of support rail 86 depends on the general or average size of food articles being conveyed. Adjusting feed belt 70 upward results in a wider support surface, appropriate for larger or wider articles. Adjusting feed belt 70 downward results in a narrower support surface which is appropriate for smaller or narrower articles. Feed belt 70 should be adjusted so that an average size potato, when aligned with its longitudinal axis parallel to its direction of travel, will contact the medial portion and both outer portions of feed belt 70, as shown in FIG. 9. This produces optimum contact between potatoes and belt conveyor 70, resulting in the most efficient and reliable alignment and acceleration of potatoes.

FIG. 10 shows feed belt 70 adjusted too far downward. This adjustment narrows the medial portion of feed belt 70, so that the potato contacts only the outer portions of feed belt 70. Such a low adjustment can result in excessive rolling of conveyed potatoes so that stability and accurate alignment cannot be attained.

FIG. 11 shows feed belt 70 adjusted too far upward. This adjustment widens the medial portion of feed belt 70 so that the potato contacts only the medial portion of feed belt 70. This type of adjustment can allow potatoes to spin and does not force accurate longitudinal alignment.

In the illustrated embodiment the open bottom of guide trough 50 is narrower than potato 65. In some cases it may be desirable to increase the width of the guide trough bottom to approximately the width of the food articles to be conveyed, and to adjust the feed belt downward to create a conveyor trough below the bottom edges of sidewalls 55. This would allow potatoes to fall within the conveyor trough only after becoming aligned, and in some cases would provide better contact between the feed belt and the conveyed articles. Making the width of the guide trough adjustable would add a further desirable feature in such cases.

In practice, potatoes are not of a consistent diameter. Thus, the adjustments described above must be made for optimum results based on the varying diameters presented by an overall product stream. Fortunately, the feed belt configuration described above will tolerate some variation in product diameter while still producing good results. Nevertheless, proper vertical adjustment is an important factor in achieving proper transverse alignment and longitudinal orientation of products.

Figure 12:
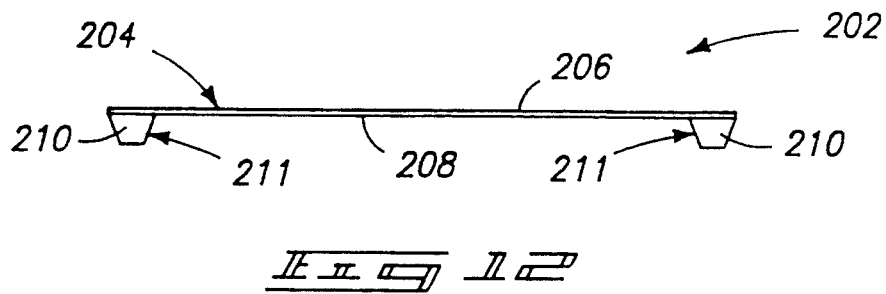
FIG. 12 is a cross-sectional view of a hold-down belt in accordance with the preferred embodiment of FIG. 1.

In addition to the components described above, feed device 20 includes an article hold-down assembly 200 positioned adjacent redirection sheave 88, as shown in FIGS. 1 and 6. Hold-down assembly 200 comprises an endless hold-down belt 202 facing feed belt 70 along the redirection arc to hold food articles against or within the concave shape of the feed belt. The construction of hold-down belt 202 is best seen in the cross-sectional view of FIG. 12. It comprises a broad flexible contact belt 204 having an outer surface 206 and an inner surface 208. At least one narrow drive belt 210 is affixed to inner surface 208. Specifically, a pair of polyurethane "V"-section belts 210 extend inward from inner surface 208 to form belt ribs 211 on inner surface 208. Drive belts 210 are transversely spaced from each other, preferably being positioned at the outermost transverse edges of contact belt 204. Contact belt 204 is made of a thin nitrile-based material such as used to form support belt 72, having a thickness of approximately 1/16th of an inch and a width about equal to that of feed belt 70.

Drive belts 210 are vulcanized or otherwise attached to contact belt 204 to form hold-down belt 202. Drive belts 210 provide a degree of longitudinal strength to hold-down belt 202.

Hold-down belt 202 is supported at upper and lower ends of its travel by idler pulley assemblies so that it wraps around redirection sheave 88 along its redirection arc. Furthermore, hold-down belt 202 extends downward beyond the redirection arc, parallel to take-off shoe 94. Hold-down belt faces feed belt 70 along the exit tangent to hold food articles within the concave shape of the feed belt along the exit tangent.

Figure 7:
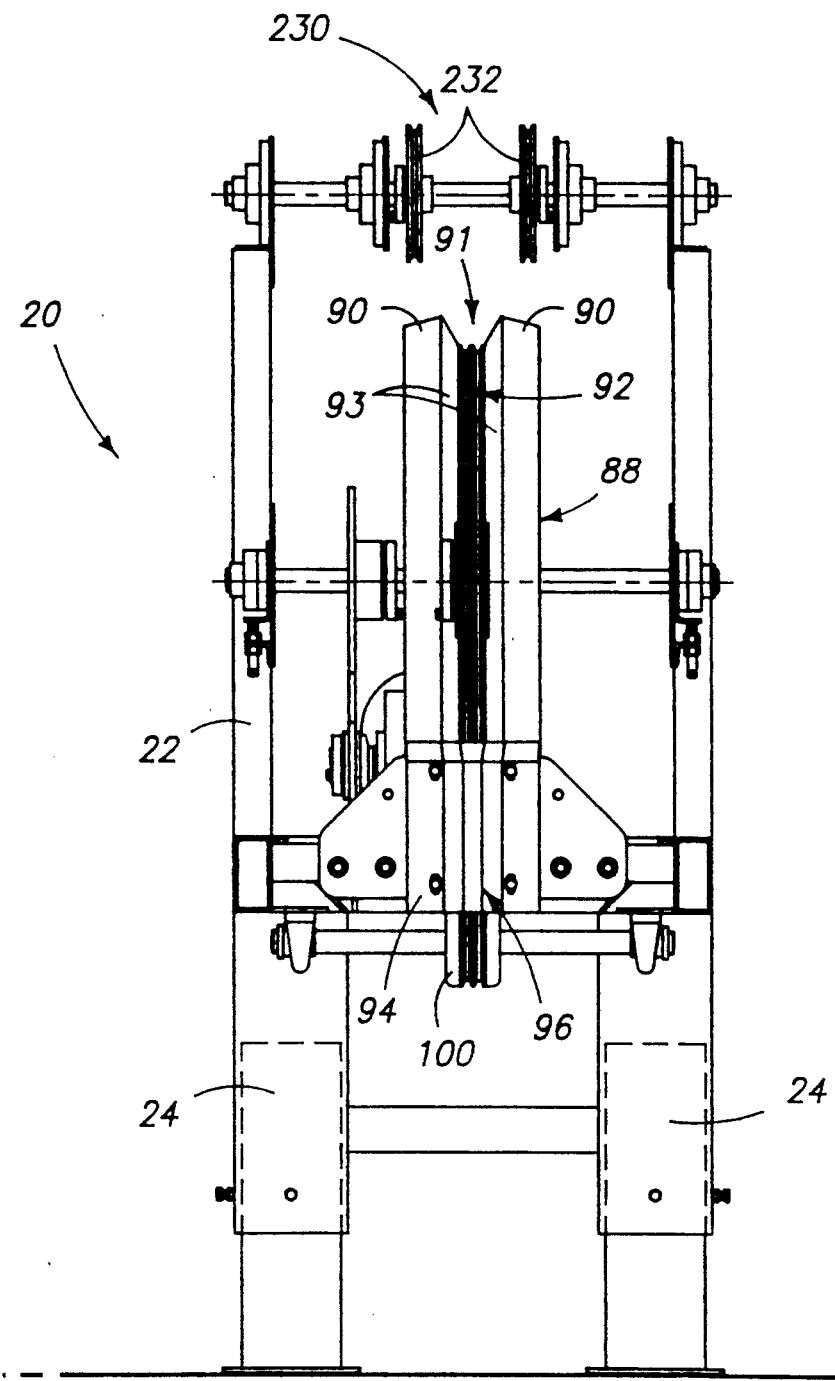
FIG. 7 is a sectional view taken along line 7—7 of FIG. 1.

Hold-down belt 202 is supported at its upper end by an upper idler pulley assembly 230 (also shown in FIG. 7). Upper idler pulley assembly 230 is formed by a spaced pair of wheels or sheaves 232. Each wheel 232 has a V-groove about its periphery and is transversely positioned to receive one of hold-down belt ribs 211 therein. Accordingly, hold-down belt 202 is supported only at its transverse edges.

A lower hold-down idler pulley assembly 234 is positioned adjacent feed belt lower idler pulley 100, to support hold-down belt 202 at its lower end. Lower hold-down idler pulley assembly 234 is formed similarly to upper idler pulley assembly 230, with a spaced pair of wheels corresponding in transverse position to ribs 211.

The hold-down assembly 200 further includes a tensioning pulley assembly 238 which is spring-loaded to apply a constant longitudinal tension to hold-down belt 202. Like idler pulley assemblies 230 and 234, tensioning pulley assembly 238 comprises a spaced pair of grooved wheels or sheaves.

As shown in FIG. 1, the pulley assemblies of hold-down assembly 200 are mounted to a hold-down frame 242. Hold-down frame 242 is mounted to stationary frame 22 for pivoting about the axle of upper idler pulley assembly 230. A hydraulic or pneumatic cylinder 244 is operable to selectively lift hold-down assembly 200 away from feed belt 70 for access and cleaning.

In operation, hold-down assembly 200 is lowered so that hold-down belt 202 is positioned against redirection sheave 88 along the redirection arc. Frictional contact between hold-down belt 202 and outer contact surfaces 90 of the redirection sheave drives hold-down belt 202 at a speed which matches that of feed belt 70. Tensioning pulley 238 maintains a constant belt pressure between hold-down belt 202 and contact surfaces 90.

Redirection sheave 80, hold-down assembly 200, and feed belt 70 form an article redirection conveyor at discharge end 54 of guide trough 50 to change the direction of food articles from horizontal to vertical while maintaining their single file and longitudinal alignment. In general terms, food articles are conveyed by feed belt 70 through guide trough 50 at a first angle from horizontal. The article redirection conveyor discharges the single-file stream of food articles at a second angle from horizontal, where the second angle is different than the first angle. In the preferred embodiment described, the first angle is equal to 0 degrees, and the second angle is equal to 90 degrees.

Potatoes or other food articles are introduced to the feed device by dumping them randomly on receiving tray 62. The vibratory motion of vibratory bed 30 propels the food articles forward through receiving tray 62 until they drop onto the concave support surface formed by feed belt 70. At this point, the food articles may be side by side or transversely aligned as shown in FIG. 2. However, the vibratory motion of guide trough 50, also imparted to outer portions 77 of feed belt 70, tends to urge the food articles down into feed belt 70, resulting in the food articles being aligned one after each other, with their longitudinal axes along the direction of conveyor travel. This alignment is accomplished by the time the food articles reach redirection sheave 88.

Figure 13:
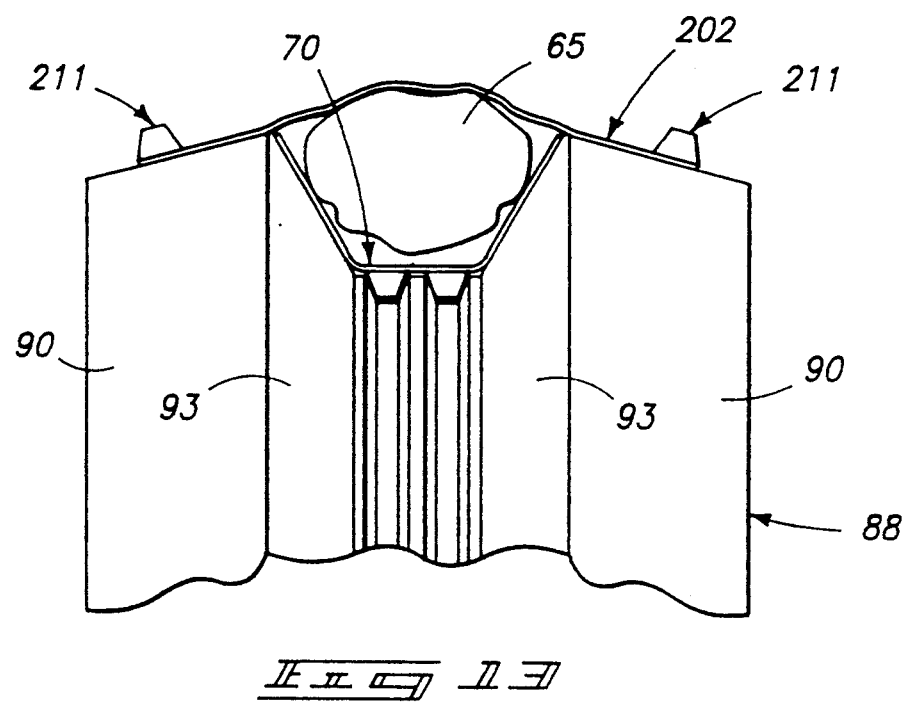
FIG. 13 is a sectional view taken along line 13—13 of FIG. 1.

FIG. 13 shows a potato 65 as it passes around redirection sheave 88. Potato 65 is held securely within the concave shape of feed belt 70 by the facing hold-down belt 202. Hold-down assembly 200 keeps hold-down belt 202 securely against the outer peripheral contact surfaces 90 of redirection sheave 88 so that feed belt 70 and hold-down belt 202 are maintained in fixed longitudinal relationship to each other as they travel about the redirection arc of redirection sheave 88. However, hold-down belt 202 is flexible enough to bulge outwardly in relation to redirection sheave 88 to accommodate varying sizes of potatoes. Tensioning pulley 238 yields to apply constant inward pressure against redirection sheave 88 and any potatoes within redirection sheave 88 as they travel about the redirection arc. Idler pulley assemblies 230 and 234 are configured to support hold-down belt 202 only at its transverse edges, along ribs 211. Thus, hold-down belt 202 is allowed to bulge and conform as necessary even when wrapping around the various idler pulley assemblies.

Figure 14:
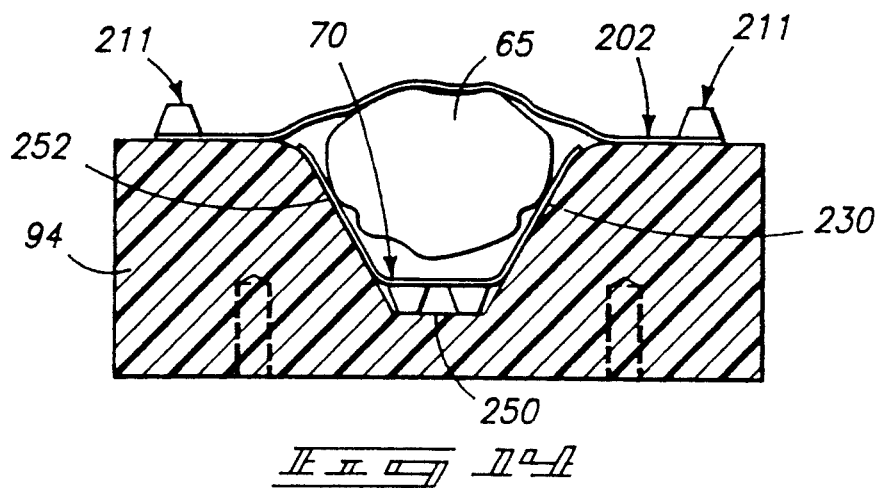
FIG. 14 is a sectional view taken along line 14—14 of FIG. 1.

FIG. 14 shows potato 65 within feed belt 70 as feed belt 70 passes through take-off shoe 94. Feed belt 70 is slidably received within take-off shoe 94 to maintain a concave cross section similar in shape to redirection sheave groove 91. Specifically, groove 96 in take-off shoe 94 is formed by an inward base 250 and opposed sidewalls 252. Sidewalls 252 are inclined at an approximately 30 degree angle similar to the sidewalls of redirection sheave 88.

Lower hold-down idler pulley 234 preferably has a diameter equal to the diameter of lower conveyor idler pulley 100, and is also positioned at an identical vertical position. This insures that equal forces will be applied to both sides of food articles as they are ejected from the redirection conveyor, reducing the tendency for articles to rotate after they leave the redirection conveyor.

In some cases it may not be necessary to redirect food articles, in which case they would be ejected horizontally from the discharge end of guide trough 50. Discharge angles other than vertical could also be provided as needed by appropriately positioning take-off shoe 94. A further contemplated feature is a final section of feed belt 70 which extends beyond guide trough 50. This would allow any food articles which are not singly aligned to fall of the sides of feed belt 70.

Most components of feed device 20 are fabricated from stainless steel. Some components, such as many components in contact with either feed belt 70 or hold-down belt 202, are fabricated from plastic such as ultra-high molecular weight polyurethane (UHMW).

The conveyor system described above provides high speed singulation and alignment of oblong food articles such as potatoes. Furthermore, the system is capable of projecting such food articles in any desired direction, for entry into downstream handling or processing devices. The device described is simple and reliable, while achieving conveyor speeds which have not previously been attainable.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A vibratory feed device for producing a high-speed single-file stream of food articles, the feed device comprising:
    a guide trough extending longitudinally from a receiving end to a discharge end, the trough having inclined and transversely-opposed sidewalls;
    an endless feed belt which travels longitudinally through the guide trough from the receiving end to the discharge end, the feed belt having upwardly extending outer portions which are slidably supported on the inclined sidewalls of the guide trough, the feed belt forming a concave conveyor surface for conveying food articles through the guide trough; and
    a vibratory drive connected to vibrate the guide trough and the supported outer portions of the feed belt.

2. A vibratory feed device as recited in claim 1, wherein:
    the outer portions of the feed belt are slidably supported on the inclined sidewalls of the guide trough;
    the feed belt has a medial portion which extends between the outer portions of the feed belt, the medial portion having a transverse width which forms a conveyor base surface; and
    the vibratory feed device further comprising a vertical adjustment to change the elevation of the feed belt relative to the guide trough, said vertical adjustment determining the transverse width of the feed belt medial portion.

3. A vibratory feed device as recited in claim 1, wherein:
    the feed belt has a medial portion which extends between the outer portions of the feed belt, the medial portion having a transverse width which forms a conveyor base surface; and
    the vibratory feed device further comprising a support rail which extends longitudinally beneath the feed belt, the feed belt being slidably supported on the support rail, the support rail being vertically adjustable relative to the guide trough to set the vertical elevation of the conveyor base surface relative to the guide trough.

4. A vibratory feed device as recited in claim 1, wherein:
    the feed belt has a medial portion which extends between the outer portions of the feed belt, the medial portion having a transverse width which forms a conveyor base surface;
    the vibratory feed device further comprising a support rail which extends longitudinally beneath the feed belt, the feed belt being slidably supported on the support rail, the support rail being vertically adjustable relative to the guide trough to set the vertical elevation of the conveyor base surface relative to the guide trough;
    wherein the vibratory drive is connected to vibrate the guide trough relative to the support rail.

5. A vibratory feed device as recited in claim 1, wherein the feed belt includes at least one projecting rib along its length for driving engagement with a belt drive pulley.

6. A vibratory feed device as recited in claim 1, wherein the feed belt travels through the guide trough at a first angle from horizontal, the feed device further comprising an article redirection conveyor which discharges the single-file stream of food articles at a second angle from horizontal, the second angle being different than the first angle.

7. A vibratory feed device as recited in claim 1, further comprising a redirection sheave at the discharge end of the guide trough, the feed belt wrapping at least partially around the redirection sheave, the redirection sheave having inclined sidewalls to support the feed belt in a concave shape for receiving food articles therein.

8. A vibratory feed device as recited in claim 1, further comprising:
- a redirection sheave at the discharge end of the guide trough, the redirection sheave supporting the feed belt along a redirection arc which extends at least partially about the redirection sheave, the redirection sheave having inclined sidewalls to support the feed belt in a concave shape for receiving food articles therein; and
- an endless hold-down belt facing the feed belt along the redirection arc to hold food articles within the concave shape of the feed belt along the redirection arc.

9. A vibratory feed device as recited in claim 8, wherein the hold-down belt includes a pair of projecting ribs along its length, the ribs being transversely spaced from each other.

10. A vibratory feed device as recited in claim 8, further comprising a feed belt take-off shoe which supports the feed belt along an exit tangent from the redirection arc, the take-off shoe having inclined sidewalls to support the feed belt in a concave shape for receiving food articles therein, the endless hold-down belt facing the feed belt along the exit tangent to hold food articles within the concave shape of the feed belt along the exit tangent.

11. A vibratory feed device as recited in claim 1, further comprising:
- a redirection sheave at the discharge end of the guide trough, the redirection sheave supporting the feed belt along a redirection arc which extends at least partially about the redirection sheave; and
- a endless hold-down belt facing the feed belt along the redirection arc to hold food articles against the feed belt along the redirection arc.

12. A vibratory feed device as recited in claim 11, wherein the hold-down belt includes a pair of projecting ribs along its length, the ribs being transversely spaced from each other.

13. A vibratory feed device as recited in claim 11, further comprising a feed belt take-off shoe which supports the feed belt along an exit tangent from the redirection arc, the endless hold-down belt facing the feed belt along the exit tangent to hold food articles against the feed belt along the exit tangent.

14. A vibratory feed device as recited in claim 11, wherein the hold-down belt is positioned against the redirection sheave along the redirection arc to be frictionally driven thereby.

15. A vibratory feed device for producing a high-speed single-file stream of food articles, the feed device comprising:
- a guide trough extending longitudinally from a receiving end to a discharge end, the guide trough having a pair of inclined and transversely-opposed sidewalls which extend longitudinally between the receiving end and the discharge end;
- an endless flexible feed belt which travels longitudinally through the guide trough between the inclined sidewalls from the receiving end to the discharge end, the feed belt having outer portions which are slidably supported on the guide trough sidewalls to form a concave conveyor surface for conveying food articles through the guide trough, the feed belt also having a medial portion which extends between the outer portions of the feed belt to form a conveyor base surface;
- a stationary support rail which extends longitudinally beneath the feed belt, the medial portion of the feed belt being slidably supported on the support rail; and
- a vibratory drive connected to vibrate the guide trough relative to the support rail.

16. A vibratory feed device as recited in claim 15, the conveyor base surface having a transverse width, wherein the elevation of the support rail is adjustable relative to the guide trough to determine the transverse width of the conveyor base surface.

17. A vibratory feed device as recited in claim 15, wherein the feed belt includes at least one projecting rib along its length, the support rail having at least one longitudinal groove which receives the projecting rib of the feed belt.

18. A vibratory feed device as recited in claim 15, wherein the feed belt travels through the guide trough at a first angle from horizontal, the feed device further comprising an article redirection conveyor which discharges the single-file stream of food articles at a second angle from horizontal, the second angle being different than the first angle.

19. A vibratory feed device as recited in claim 15, further comprising a redirection sheave at the discharge end of the guide trough, the feed belt wrapping at least partially around the redirection sheave, the redirection sheave having inclined sidewalls to support the feed belt in a concave shape for receiving food articles therein.

20. A vibratory feed device as recited in claim 15, further comprising:
- a redirection sheave at the discharge end of the guide trough, the redirection sheave supporting the feed belt along a redirection arc which extends at least partially about the redirection sheave, the redirection sheave having inclined sidewalls to support the outer portions of the feed belt in a concave shape for receiving food articles therein; and
- an endless hold-down belt facing the feed belt along the redirection arc to hold food articles within the concave shape of the feed belt along the redirection arc.

21. A vibratory feed device as recited in claim 20, wherein the hold-down belt includes a pair of projecting ribs along its length, the ribs being transversely spaced from each other.

22. A vibratory feed device as recited in claim 20, further comprising a feed belt take-off shoe which supports the feed belt along an exit tangent from the redirection arc, the take-off shoe having inclined sidewalls to support the outer portions of the feed belt in a concave shape for receiving food articles therein, the endless hold-down belt facing the feed belt along the exit tangent to hold food articles within the concave shape of the feed belt along the exit tangent.

23. A vibratory feed device as recited in claim 15, further comprising:
a redirection sheave at the discharge end of the guide trough, the redirection sheave supporting the feed belt along a redirection arc which extends at least partially about the redirection sheave; and
a endless hold-down belt facing the feed belt along the redirection arc to hold food articles against the feed belt along the redirection arc.

24. A vibratory feed device as recited in claim 23, wherein the hold-down belt includes a pair of projecting ribs along its length, the ribs being transversely spaced from each other.

25. A vibratory feed device as recited in claim 23, further comprising a feed belt take-off shoe which supports the feed belt along an exit tangent from the redirection arc, the endless hold-down belt facing the feed belt along the exit tangent to hold food articles against the feed belt along the exit tangent.

26. A vibratory feed device as recited in claim 23, wherein the hold-down belt is positioned against the redirection sheave along the redirection arc to be frictionally driven thereby.

27. A vibratory feed device for producing a high-speed single-file stream of food articles, the feed device comprising:
a guide trough extending longitudinally from a receiving end to a discharge end, the trough having inclined and transversely-opposed sidewalls;
an endless feed belt which travels longitudinally through the guide trough from the receiving end to the discharge end, the feed belt having upwardly extending outer portions, the feed belt forming a concave conveyor surface for conveying food articles through the guide trough;
a vibratory drive connected to vibrate the guide trough;
a redirection sheave at the discharge end of the guide trough, the redirection sheave supporting the feed belt along a redirection arc which extends at least partially about the redirection sheave; and
a endless hold-down belt facing the feed belt along the redirection arc to hold food articles against the feed belt along the redirection arc.

28. A vibratory feed device as recited in claim 27, wherein the outer portions of the feed belt are slidably supported on the inclined sidewalls of the guide trough.

29. A vibratory feed device as recited in claim 27, wherein:
the outer portions of the feed belt are slidably supported on the inclined sidewalls of the guide trough;
the feed belt has a medial portion which extends between the outer portions of the feed belt, the medial portion having a transverse width which forms a conveyor base surface; and
the vibratory feed device further comprises a vertical adjustment to change the elevation of the feed belt relative to the guide trough, said vertical adjustment determining the transverse width of the feed belt medial portion.

30. A vibratory feed device as recited in claim 27, wherein:

the feed belt has medial portion which extends between the outer portions of the feed belt, the medial portion having a transverse width which forms a conveyor base surface; and
the vibratory feed device further comprising a support rail which extends longitudinally beneath the feed belt, the feed belt being slidably supported on the support rail, the support rail being vertically adjustable relative to the guide trough to set the vertical elevation of the conveyor base surface relative to the guide trough.

31. A vibratory feed device as recited in claim 27, wherein the feed belt includes at least one projecting rib along its length for driving engagement with a belt drive pulley.

32. A vibratory feed device as recited in claim 27, wherein the redirection sheave has inclined sidewalls to support the feed belt in a concave shape for receiving food articles therein.

33. A vibratory feed device as recited in claim 27, further comprising a feed belt take-off shoe which supports the feed belt along an exit tangent from the redirection arc, the endless hold-down belt facing the feed belt along the exit tangent to hold food articles against the feed belt along the exit tangent.

34. A vibratory feed device as recited in claim 27, wherein the hold-down belt is positioned against the redirection sheave along the redirection arc to be frictionally driven thereby.

35. A feed device for producing a high-speed single-file stream of food articles, the feed device comprising:
a guide trough extending longitudinally from a receiving end to a discharge end, the trough having inclined and transversely-opposed sidewalls;
an endless feed belt which travels longitudinally through the guide trough from the receiving end to the discharge end, the feed belt having upwardly extending outer portions, the feed belt forming a concave conveyor surface for conveying food articles through the guide trough;
a redirection sheave at the discharge end of the guide trough, the redirection sheave supporting the feed belt along a redirection arc which extends at least partially about the redirection sheave; and
a endless hold-down belt facing the feed belt along the redirection arc to hold food articles against the feed belt along the redirection arc.

36. A feed device as recited in claim 35, wherein the outer portions of the feed belt are slidably supported on the inclined sidewalls of the guide trough.

37. A feed device as recited in claim 35, wherein:
the outer portions of the feed belt are slidably supported on the inclined sidewalls of the guide trough;
the feed belt has a medial portion which extends between the outer portions of the feed belt, the medial portion having a transverse width which forms a conveyor base surface; and
the feed device further comprises a vertical adjustment to change the elevation of the feed belt relative to the guide trough, said vertical adjustment determining the transverse width of the feed belt medial portion.

38. A feed device as recited in claim 35, wherein:
the feed belt has a medial portion which extends between the outer portions of the feed belt, the medial portion having a transverse width which forms a conveyor base surface; and the feed device further comprising a support rail which extends longitudinally beneath the feed belt, the feed belt being slidably supported on the support rail, the support rail being vertically adjustable relative to the guide trough to set the vertical elevation of the conveyor base surface relative to the guide trough.

39. A feed device as recited in claim 35, wherein the feed belt includes at least one projecting rib along its length for driving engagement with a belt drive pulley.

40. A feed device as recited in claim 35, wherein the redirection sheave has inclined sidewalls to support the feed belt in a concave shape for receiving food articles therein.

41. A feed device as recited in claim 35, further comprising a feed belt take-off shoe which supports the feed belt along an exit tangent from the redirection arc, the endless hold-down belt facing the feed belt along the exit tangent to hold food articles against the feed belt along the exit tangent.

42. A feed device as recited in claim 35, wherein the hold-down belt is positioned against the redirection sheave along the redirection arc to be frictionally driven thereby.

43. A feed device as recited in claim 35, further comprising a vibratory drive connected to vibrate the guide trough.

* * * * *